United States Patent

[11] 3,594,074

[72] Inventor Hyman Rosen
Hewlett, N.Y.
[21] Appl. No. 833,611
[22] Filed June 16, 1969
[45] Patented July 20, 1971
[73] Assignee Alexander Mencher
Forest Hills, N.Y.
a part interest
Continuation-in-part of application Ser. No.
564,268, July 11, 1966, now Patent No.
3,468,602.

[54] CONTACT LENS WITH FLEXIBLE CENTRAL PORTION
2 Claims, 11 Drawing Figs.
[52] U.S. Cl. .................................... 351/160
[51] Int. Cl. .................................... G02c 7/04
[50] Field of Search .......................... 350/160–
–162

[56] References Cited
UNITED STATES PATENTS
2,211,086 8/1940 Tillyer .................... 351/160
2,241,415 5/1941 Moulton .................. 351/162
2,664,025 12/1953 Herman .................. 351/160 X
3,228,741 1/1966 Becker .................... 351/160
3,468,602 9/1969 Rosen ..................... 351/160
FOREIGN PATENTS
802,486 10/1958 Great Britain ............. 351/160
852,836 11/1960 Great Britain ............. 351/160
OTHER REFERENCES
Bier CONTACT LENS ROUTINE AND PRACTICE Second Edition Textbook published 1957 pages 56 and 57 cited Copy in 351/160

*Primary Examiner*—David H. Rubin
*Attorney*—Alexander Mencher

ABSTRACT: The invention relates to the structure of a yieldable and resilient corneal contact lens having a central and domed area capable of relative and substantial diaphragmatic action without contacting the eye and responsive to exertion and release of pressure induced by eyelid movement. Said lens has an outer peripheral area engageable with the eye and is provided with channels on the inner side to permit ingress and egress of eye or tear fluids to and from said domed area which latter serves as a fluid chamber. An intermediate thickened or reinforced peripheral area connected to the edge of the domed area serves as the support or fulcrum for the diaphragmatic action of the domed area and also serves to connect with the outer peripheral engageable area adapted to float on and adhere to the eye proximate to the cornea.

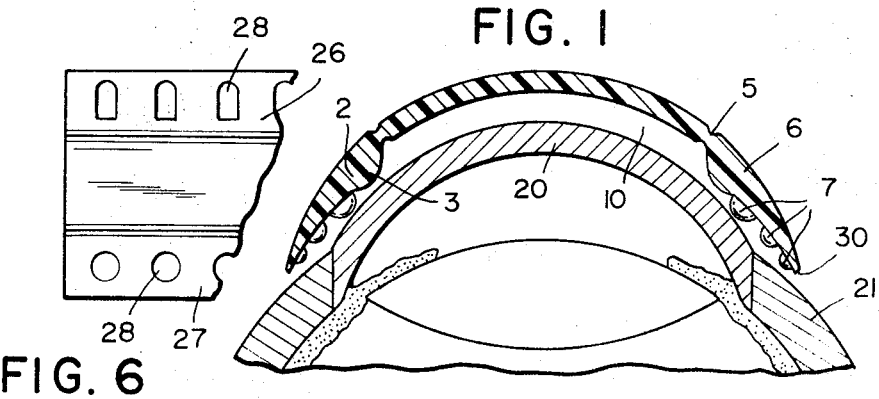
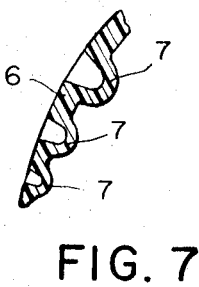
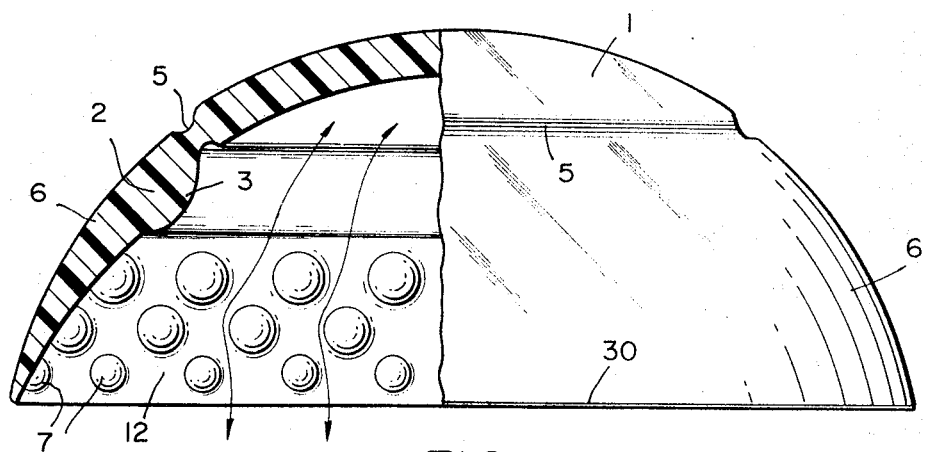
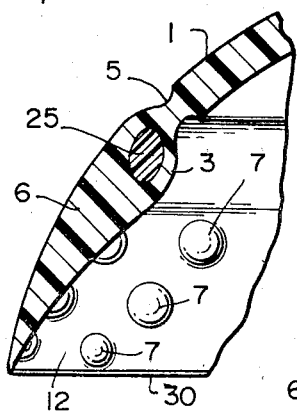
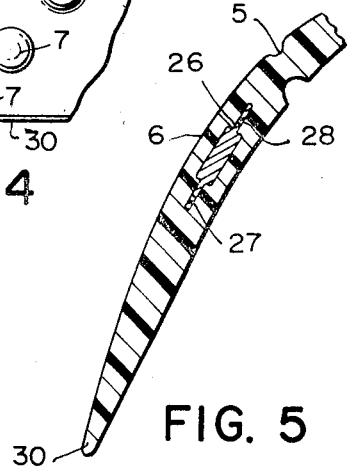
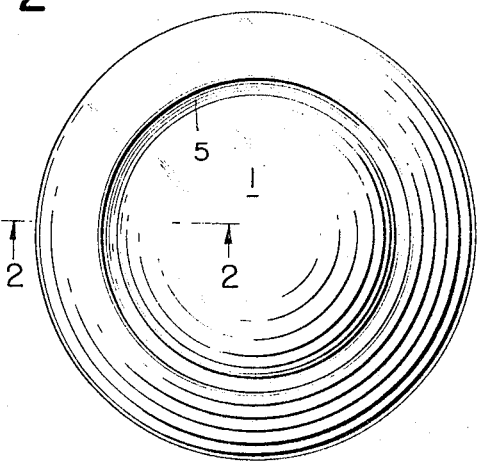
INVENTOR
HYMAN ROSEN

INVENTOR
HYMAN ROSEN
BY
ATTORNEY

CONTACT LENS WITH FLEXIBLE CENTRAL PORTION

This application is a continuation-in-part of a copending application filed by applicant on July 11, 1966 in U.S. Patent Office under Ser. No. 564,268. Said copending application matured into U.S. Pat. No. 3,468,602 under date of Sept. 23, 1969.

This invention relates generally to contact lenses adapted to be easily fitted to the individual wearer, to be worn with comfort, to correct vision and to aid materially in providing for better sight for certain corneal conditions.

It is an object of the invention to provide a contact lens of specified structure and which can be made in whole or in part of a soft and flexible plastic material thereby securing comfort in wear and by means of which resilient flexure as an effective diaphragm is imparted to at least a portion of the lens and particularly to its optical central portion. The lens thereby in effect becomes a responsive diaphragm for the optics and kinetics of the eye and serves to effect hydraulic pumping action of the tear layer within and outside of the lens. The structure furthermore is of such nature that the diaphragm portion at no time touches the corneal surface of the eye as will appear.

It is a further object of the invention to provide a lens which can be produced by known molding methods and inexpensively so that the lens can, after a relatively short period of wear, be disposed of and a new one substituted.

More particularly, the invention contemplates the provision of a contact lens having a central optical portion which is soft, flexible and resilient; which is capable of flexing under eyelid pressure and responding to physiological changes involving edema or serving as a shield under conditions of infections and adhesions without sensation and incidental irritation. The central optical portion has an effective mounting ring so that while it is capable of flexing, it will not distort from its desired shape. The lens is provided beyond said ring with a radially extending eye-contacting soft flange or rim, the rim being internally formed with ingress and egress means. These means are adapted to be spaced apart so that they define flow spaces or passages between them, and the central diaphragmous portion of the lens, when the lens is worn, is maintained in spaced relationship from the cornea and there is maintained at all times a fluid chamber between said portion and the surface of the cornea with tear fluid therein. When the central portion of the lens is flexed or depressed under eyelid pressure upon blinking of the eyelid, the central part of the lens will be depressed but not to an extent to contact the cornea; and the fluid, collected in the chamber, will only be partially expelled through the flow spaces or passages. Upon the restoration of the central portion of the lens to its normal position when eyelid pressure is relieved on the lens, a return flow of the fluid to the chamber will result.

With these and other objects to be hereinafter set forth in view, I have devised the arrangement of parts to be described and more particularly pointed out in the claims appended thereto.

In the accompanying drawings, wherein illustrative embodiments of the invention are disclosed, FIG. 1 is a diagrammatic view of a portion of an eye with a lens of the improved construction applied thereto;

FIG. 2 is an enlarged side view of the lens, with a part thereof being shown in section, that section being taken on the line 2–2 of FIG. 3, looking in the direction of the arrows;

FIG. 3 is a top plan view of the lens;

FIG. 4 is a sectional view of a part of the lens showing the employment of an embedded stiffening ring;

FIG. 5 is a sectional view of a part of the lens, showing a different form of stiffening ring;

FIG. 6 is a view of the stiffening ring embodied in the structure of FIG. 5;

FIG. 7 is a detail view showing how the projections can be produced in the inner surface of the flange or rim of the lens;

Figure 8:
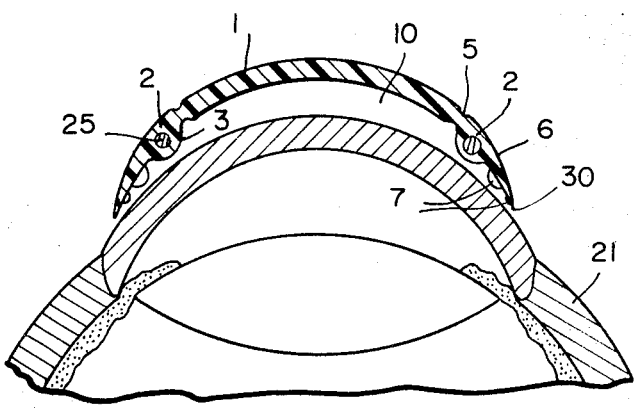
FIG. 8 is a view similar to FIG. 1 with the lens thereof shown being of a size to fit the cornea only.

In FIG. 1 of the drawing is diagrammatically shown a portion of an eye, the cornea thereof being shown at 20 and the sclera at 21. In the embodiments of the invention shown in the drawings, the lens is preferably formed from a soft transparent thermoplastic material such as polyvinyl chloride, copolymers of ethylene and vinyl acetate containing from about 10 percent to 25 percent of vinyl acetate, acrylic polymers having the desired combination of transparency and suitable flexibility such as a copolymer of butyl acrylate and methyl methacrylate, or other inert thermoplastic composition capable of receiving a superimposing layer of material for any required purposes of lamination and imparting the characteristics of the lens structure aforesaid. The lens includes a central flexible, kinetic and optical portion or diaphragm indicated at 1, this part of the lens being of such flexibility that it is capable of flexure by eyelid pressure during lowering of the eyelid to thereby expel some of the eye fluid that is confined between this part of the lens and the corneal part 20 of the eye located behind it as shown in FIG. 1.

Figure 9:
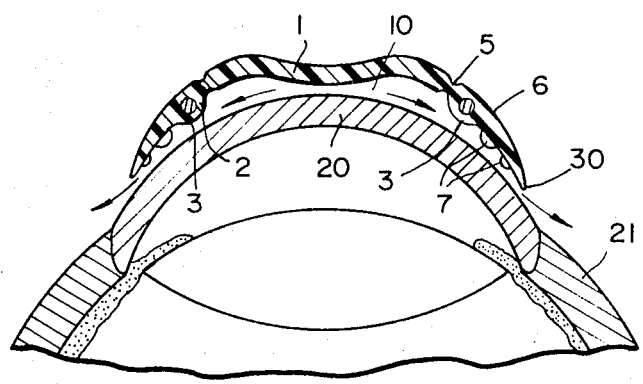
FIG. 9 is a similar view showing the fluid flow when the central part of the lens is depressed by eyelid pressure.

In the embodiment of FIG. 1 the lens is shown of a size to fit over the cornea and to extend over a part of the sclera. In FIGS. 8 and 9 the lens is of a smaller size to fit the cornea only.

The peripheral edge portion of the part 1 of the lens or the central lens or optical portion is encircled by a mounting or stiffening ring 2 which can be provided in a number of ways. One way is to materially thicken the body of the lens around the edge of central lens portion 1 as shown at peripheral inner wall portion 3 in FIGS. 1 and 2. Another way of providing support for said portion 1 is to incorporate or embed a separate ring of relatively stiff material, and of greater stiffness than portion 1, in the body of the lens as shown at 25 in FIG. 4. Such a ring can be composed of a relatively stiff plastic and can be of the shape shown in FIG. 4 or of any other desired shape. For example, in FIG. 5 the mounting or reinforcement or stiffening ring may assume the shape shown in FIGS. 5 and 6, wherein the embedded ring has flanges 26 and 27 provided with the apertures shown at 28. The edge of the central lens portion may be reinforced in any other desired way. The mounting or stiffening ring as employed herein serves to maintain the shape of the central lens portion 1 as heretofore stated since it holds this part of the lens to a specific shape and yet enables it to flex under lid pressure to thereby cause the expulsion and retraction of eye fluid during the blinking movements of the eyelid, the central portion 1 serving as a kinetic diaphragm as well as an optical element.

The thickened portion of the lens, generally shown at 2, employed to form a stiffened annular ring around the central portion 1 of the lens, may thus be an integral part of the portion 1 of the lens; it can be a hardened inserted or embedded ring or it can be otherwise produced. The optimum sought is a stiffened annulus arranged around the central lens portion 1 to maintain the stability thereof during the use of the lens.

To facilitate the flexure of the central or diaphragmous part 1 of the lens under eyelid pressure, the portion 1 of the lens can be provided with a weakened line or groove 5 located around its edge to augment the function of the mounting ring.

The lens is provided with a radially extending rim or flange 6 as a peripheral portion located beyond the mounting ring or stiffened part of the lens, said portion constituting an eye-contacting element, and it is provided on its inner surface with channels 12. Said channels can be formed in any conventional manner as by raised projections 7 or by depressions or cuts (not shown) in the peripheral portion.

In FIGS. 1–9, the protuberances or projections 7 are disclosed as rounded nodes which increase in height from the outer peripheral edge 30 of the peripheral portion 6 toward the inner edge thereof as clearly shown in FIGS. 1 and 2. The arrangement is such that when the contact lens is worn, the projections, or at least some of them, will rest against the surface of the eye.

Figure 10:
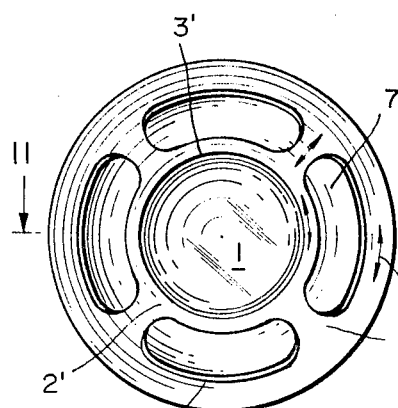
FIG. 10 is a plan view of a modified lens formation taken from the concave side.
Figure 11:
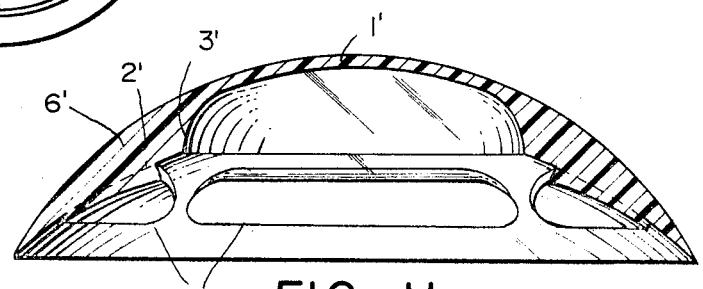
FIG. 11 is a sectional view thereof taken on the line 11–11 of FIG. 10 looking in the direction of the arrows.

FIGS. 10 and 11 illustrate a modified lens formation wherein the intermediate reinforced portion 2' at inner peripheral wall portion 3' joins the periphery of the central lens portion 1', the junction area of said portion 2' serving as the annular supporting fulcrum for diaphragmatic operation. Grooves or channels 12' are molded or formed on the inner surface of the peripheral portion 6'. As shown, said channels result from a series of spaced concentrically arranged raised elements 7' of any desired shape to create desired channel shapes, or said channels may be formed by depressions or cuts (not shown) on the inner surface of the peripheral portion 6'. Raised elements 7' preferably taper radially as seen in FIG. 11 and the surfaces thereof have suitable radii of curvature as to rest against the surface of the eye at or proximate to the peripheral portion of the cornea.

Compression molding is preferred in the production of the contact lens of the invention. Although any of the molding materials heretofore set forth is capable of use, the temperatures, pressures, cooling, chilling, timing and other factors in the molding process will somewhat vary for each.

By way of example, the material used for the description of the production of the contact lens of the invention herein is an ethylene vinyl acetate copolymer material having desired and controllable characteristics (depending upon formulation) impartible to the lens product as a result of the molding operation. Said material has desired optical clarity, an index of refraction of about 1.49 to about 1.50, is wettable, has durable characteristics of elasticity or resiliency, flexibility, softness, inertness and other qualities necessary toward optimum performance of functions described in the lens structure.

The ethylene vinyl acetate copolymer used is sold commercially under the registered trademark "Ultrathene" EVA Copolymers by National Distillers and Chemical Corporation of 99 Park Avenue, New York, N.Y. This company also sells custom formulation of this material for specific requirements.

For individual custom production of the contact lens of the invention, the concave die section of a compression molding die is adapted to receive said copolymer material in the form of pellets. Then conventional steps of compression molding procedure are followed such as heating, cooling, chilling when necessary, separation of die parts, withdrawal of molded product and trimming of flash. Thus, the concave die section with pellets therein is heated to convert them to a melt at a temperature of about 225° F. to 300° F. The melt is then compressed by another registrable and suitably heated die section at a pressure of approximately 50 p.s.i. for lens formation. The die sections are conventionally cooled from time of registration of the die sections for about a minute, the die sections separated, the molded product suitably withdrawn and the flash on the lens edges cut either by punching or rotary cutting. To bring out optimum clarity of the molded product, if found necessary, the die pieces at time of registration are conventionally chilled at about 30° F. for about one-half minute, the die sections separated and the molded product withdrawn for flash removal operation.

For cyclic and commercial manufacture of the contact lens, a sheet or strip can be suitably extruded from the molten pellets of the said copolymer material and engaged on opposite sides while in molten condition at a temperature of about 225° F. to 300° F. by multiple pairs of suitably heated die pieces for compression at selected areas. Subsequent steps of cooling or chilling, die separation, withdrawal of molded products and flash removal therefrom follow the steps above outlined.

Three standard back-of-the-lens designs would anatomically fit over almost all eyes. By providing molds with the desired series of corrections either in quarter or half units, molds may be provided which would permit production of lenses that are directly usable by the patient without grinding or other processing.

The effective resting surface of the lens on the eye is afforded by projections 7 and 7' and the combined contacting surface of said projections is shaped to coincide with substantially the same radius of curvature of the corresponding corneal area thereby causing adherence of the lens thereto and floating thereon. The said projections are separated by a thin film of tear fluid which effects capillary adhesion between the lens and the cornea.

For introduction into the eye, the lens may be squeezed, put under the lid and allowed to assume normal shape. To remove the lens, the lid may be closed and the lens moved to a corner of the eye for removal. Other convenient means may be used for lens insertion and removal as required.

The lens structure and function permit a better controlled physical form fit close to the eye and maintenance thereof since the peripheral portions 6 and 6' essentially are involved (the central lens portions 1 and 1' being domed to a height of about one-half to 1 millimeter except in cases of pathological protuberances). The fit does not cause any possible impairment of physiological function but rather enhances such function by the specific diaphragmatic pumping action in conjunction with channels 12 and 12'. Such pumping action allows little relative movement but maintenance of position between the lens and the cornea. In fact said lens may be worn during sleeping hours.

The pressure on the central lens portions 1 and 1' is dissipated in deformation thereof and is not transmitted to the resting portion of the lens on the eye.

The shape of the lens is such that when it is placed over the eye as shown in FIG. 1, the central flexible diaphragm of the lens will be spaced away from the cornea 20 of the eye so that a fluid chamber 10 will be formed between the surface of the cornea and the inside surface of the central lens portion 1. The protuberances 7 and 7' or other irregular lands provided on the inside face of the rim or peripheral portions 6 and 6' are spaced apart so that fluid passages 12 and 12' are resultantly formed between the protuberances or projections. The protuberances, as stated, may be solid nodes molded on the flange or rim 6 or they may, as shown in FIG. 7, be produced by dimpling of the rim or flange; or the protuberances may be of any other desired shape as 7' as grooves or other means.

The channels 12 and 12' lead from the chamber 10 to outside of the lens so that the eye fluid can flow in opposite directions through the passages from the chamber 10 as indicated by the arrows in FIGS. 2 and 10.

When the lens is fitted on the eye, the diaphragm part 1 or 1' because spaced from the cornea 20 of the eye, will permit the collection of eye fluid behind the chamber 10. This aids in the correction of corneal surface astigmatism and irregularity and provides for comfort in the wear of the lens.

When the eyelid closes and opens, the "breathing function" of the diaphragm portion 1 or 1' of the lens will cause same to be slightly flexed or depressed inwardly as shown in FIG. 9 and this portion of the lens, thus acting as a flexible and resilient diaphragm, will first expel some of the eye fluid out of chamber 10 from behind the portion of the lens and then, upon return flexure of the central portion 1 or 1' to its normal form, the fluid will be drawn back into the chamber 10. The outflow of the fluid is indicated by the arrows in FIG. 9. The central portion 1 or 1' of the lens thus provides a hydraulic pump element and by the movement of the fluid from within the chamber 10 through the passages 12 or 12' the fluid will provide a washing action on the surface of the eye. While the central part 1 of the lens is depressed as shown in FIG. 9, under eyelid pressure, it is so spaced from the surface of the cornea that when depressed it does not touch the surface of the eye.

The stiffened intermediate reinforced part 2 or 2' joining the central part of the lens, will permit flexure of this part of the lens as herein described while maintaining a sphericity of the lens, thus not disturbing the required optical conditions.

Peripheral portions 6 or 6' of the lens may be of a flexibility similar to that of the central lens portions 1 and 1' or they may be either of greater or less stiffness; the softness thereof, however, being limited to characteristics of resilient yieldability and conformability to the surface of the corneal resting area without affecting in function the integrity of the central lens or optical portions 1 and 1'.

The arrangement described is such that a lens of the types described can be economically produced and hence can be sold cheaply and as a result it can be discarded after a relatively short period of use. The structure of the lens is such that fitting procedure is greatly simplified so that the lens can be fitted quickly and by persons with relatively little optical experience.

The disposition of and the continued maintenance of eye or tear fluid behind the lens and over the cornea of the eye without corneal contact by the diaphragm part is highly advantageous and provides in many cases for the correction of corneal irregularities and resultant corneal astigmatism. Conditions of edema produced by colds, menstrual periods and fluid imbalance; and use of the lens as a shield during conditions of infection or adhesions between lid and cornea are accommodated by the invented structure. Such accommodation is due to the responsiveness of the diaphragm to physiological changes without sensation and incidental irritation.

I wish it understood that minor changes and variations in the structure, material, location, integration and number of parts may all be resorted to without departing from the spirit of the invention and the scope of the appended claims.

I claim:

1. A soft plastic corneal contact lens adapted to float on and adhere to the cornea comprising a transparent, noncontacting, resiliently distortable and normally dome-shaped central lens portion adapted to form with the cornea the upper wall of a tear fluid chamber, an outer peripheral portion having spaced projections formed on the inner surface, said projections each having an inner concave surface to engage with the corresponding area of the convex-shaped peripheral portion of the cornea, said spaced projections providing radial fluid passages therebetween for egress and ingress of tear fluid from and into the fluid chamber, and an intermediate thickened portion joining the central and peripheral portions, said spaced projections being substantially kidney shaped in outline and each increasing in thickness from the outer to the inner periphery of said peripheral portion, the inner and outer edges of said kidney-shaped projections being spaced from the intermediate thickened portion and the peripheral edge of the lens, respectively, said central lens portion being adapted to serve as a diaphragm wherein on eyelid closure the diaphragm yields inwardly without engaging the cornea forcing tear fluid out of the chamber, and wherein on eyelid opening the diaphragm springs back to normally domed position and thereby drawing tear fluid into the said chamber.

2. A soft corneal contact lens as set forth in claim 1 wherein said intermediate thickened portion includes a stiffening core embedded in the material of the corneal contact lens.